Patented Nov. 4, 1924.

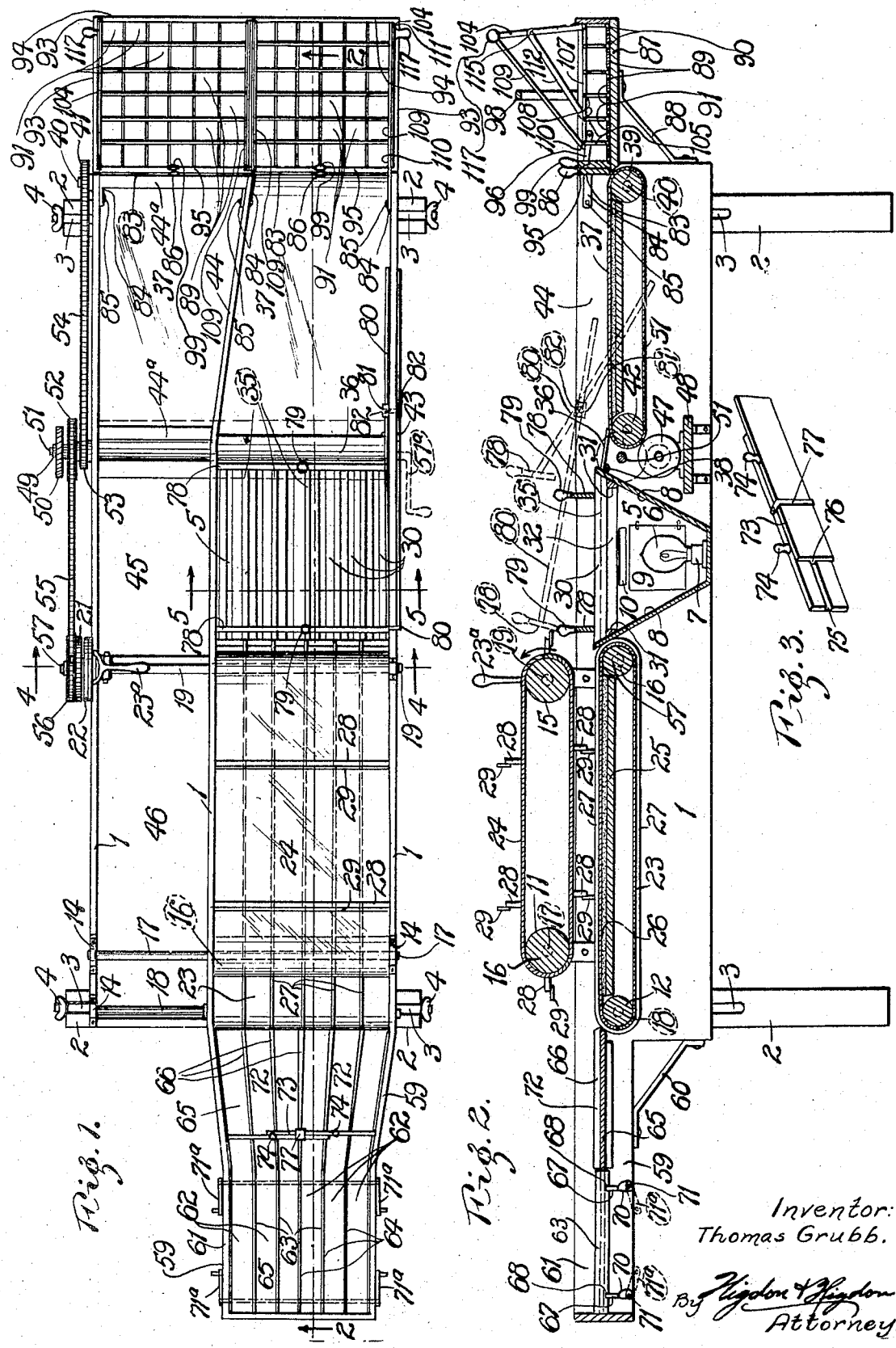

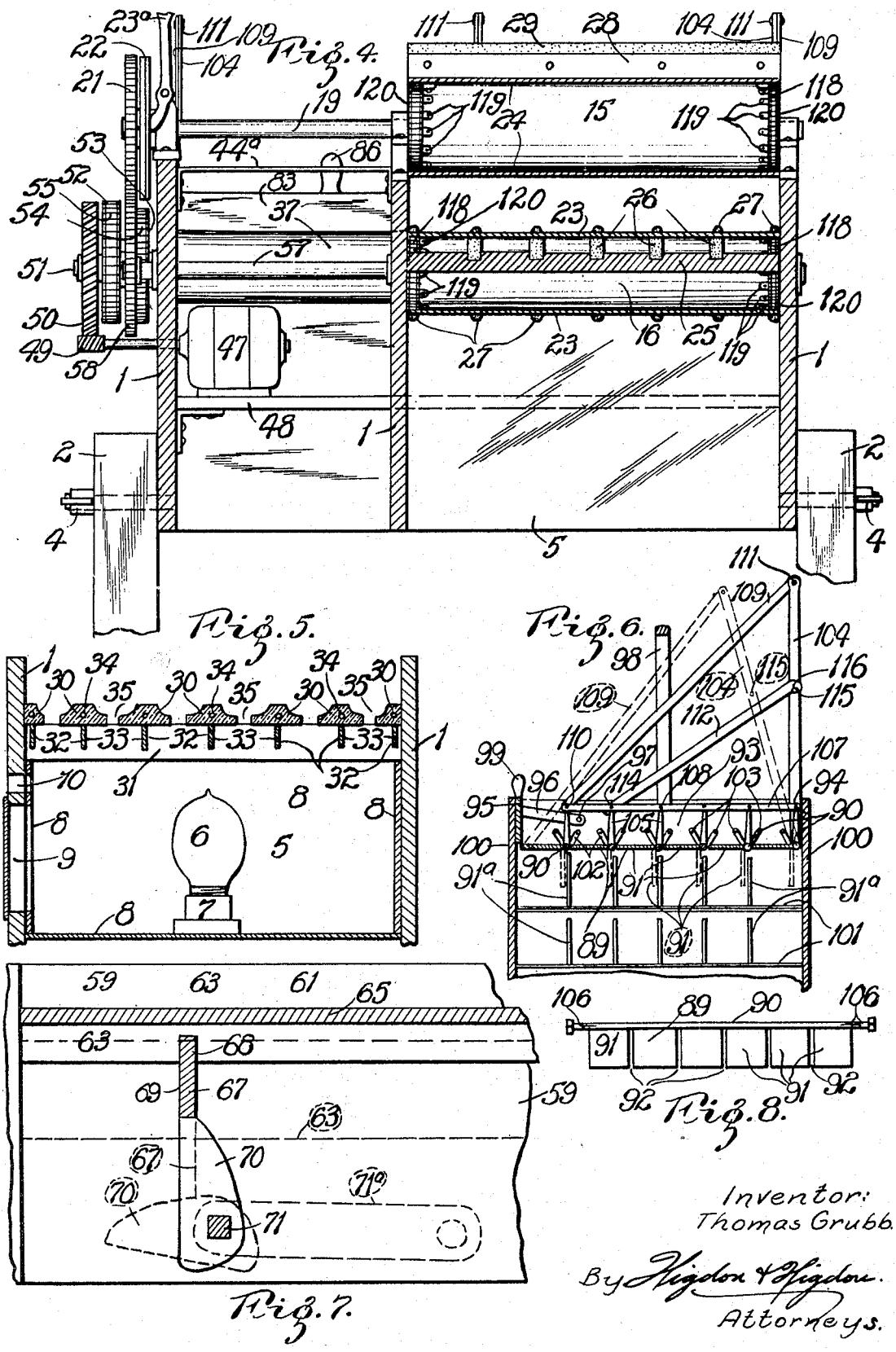

1,514,281

UNITED STATES PATENT OFFICE.

THOMAS GRUBB, OF ST. LOUIS, MISSOURI.

EGG-CANDLING DEVICE.

Application filed January 21, 1924. Serial No. 687,519.

*To all whom it may concern:*

Be it known that I, THOMAS GRUBB, a citizen of the United States, residing at St. Louis, in the State of Missouri, have invented certain new and useful Improvements in Egg-Candling Devices, of which the following is a specification containing a full, clear, and exact description, reference being had to the accompanying drawings, forming a part hereof.

This invention relates to testing devices, particularly to devices for testing or candling eggs.

The principal object of my invention is to improve upon the egg-candling device that is shown and described in my prior application, filed March 24, 1922, Serial No. 653,359; whereby the construction and operation of the machine will be reliable and efficient.

This invention relates to power-driven devices which shall be capable of testing large quantities of eggs in a very short time, and an additional object of the invention is the provision of a device for this purpose which shall be primarily a time and labor saver, especially adapted for use in commission houses, storage ware houses, and elsewhere.

An important and more specific object of the invention is the provision of a device of this character which shall include means for causing an endless traveling feed-belt or apron to pass continuously towards a source of light and deliver the eggs at a point above said light; means for passing the eggs across said light, to test the same; and another endless traveling-belt which shall receive the tested eggs after they have been passed across said light, and deliver same to the repacking members, to be again packed in crates.

A very important object is the provision of means under manual control of the operator, for turning the eggs back and forth while they are under inspection, at a point above the testing-light, so that said eggs may be viewed from both sides or both ends.

Still another object is to provide improved delivery-means which will automatically operate to place the tested eggs (as well as the small-sized eggs) into portable recasing or re-crating receptacles which have dumping-bottoms, without it being necessary for such eggs to be touched by the operator's hands.

Still another object is the provision of means for enabling the different grades and sizes of eggs to be tested and separated after such testing.

Still another object is the provision of improved means beneath the endless traveling feed-belt, for yieldingly supporting the latter in a horizontal plane, and preventing it from sagging, while at the same time the eggs will rest thereon in perfect safety, and be held up in proper relation to be engaged by the traveling overhead endless separating or grouping-belt.

Still another object is to provide an egg testing device of the character herein-described, with an overhead endless grouping belt carrying depending rakes which group the eggs upon the feed-belt into lots of say three-dozen each, just prior to pushing them upon the transparent supports above the source of light.

Still another object is to provide an improved transparent supporting-means for the groups of eggs above the source of light; whereby the turning of the eggs above said light will be greatly facilitated, and the testing operation will be rendered more efficient.

Still another object is to provide an egg-testing device of the character described with an improved motor-drive, which will be simple and inexpensive in manufacture, easy to operate, very rapid in operation, positive and efficient in use and a considerable advance in the art.

With the above and other objects and advantages in view the invention consists in the novel construction and combination of parts hereinafter particularly described and distinctly claimed.

In the drawings,

Fig. 1 is a top plan-view of a machine constructed in accordance with my invention.

Fig. 2 is a longitudinal section of the same, on the line 2—2 of Fig. 1.

Fig. 3 is a perspective-view of a telescopic hand-rake, used in pushing the eggs onto the feed-belt, at the feed-end of the latter.

Fig. 4 is an enlarged cross-sectional view, taken on the line 4—4 of Fig. 1.

Fig. 5 is an enlarged detail cross-sectional view, taken through the light-chamber, on the line 5—5 of Fig. 1.

Fig. 6 is an enlarged detail vertical section of the re-crating portable device, removed from the machine, and in position to re-crate a cell filled with tested eggs.

Fig. 7 is a vertical longitudinal section of a fragment of the feed-shelf construction, with vertically-adjustable partitions, used in guiding the eggs in longitudinal rows into corresponding concave feed-troughs, and Fig. 8 is a detail view of one of the dumping-bottom sections of the re-crating portable device.

Referring more particularly to the drawings, the numeral 1 designates an elongated rectangular main frame or casing, which is provided near its ends with vertically-adjustable legs 2, having slots 3 through which pass suitable clamping-bolts having winged-nuts 4; whereby the height of the frame may be varied with respect to the floor, to suit the convenience of different operators.

A light-chamber 5 is located at about the center of the length of said main frame 1, and a suitable high-powered electric or other form of lamp 6 is mounted in a common lamp-socket 7 having the usual feeding-means.

The opposite side and end walls of said light chamber are preferably composed of, or provided with, reflectors or mirrors 8 for an obvious purpose, the side-wall reflectors being inclined, to make said chamber wider at its top than at its bottom, as well as to direct the light upwardly. Fig. 2.

A suitable door 9 is provided in one of the walls of said light-chamber 5, for affording access whenever required, and horizontal-slits or openings such as 10 may be provided in the upper portion of that chamber, to allow the heat generated by said lamp to make its exit, and thereby keep the chamber comparatively cool.

Journaled transversely of the left-hand end of said frame 1, as shown in Figs. 1 and 2, are two rollers 11 and 12, the roller last-mentioned being in a plane above the other roller, and both are provided with well-known screw adjusting-means indicated at 14, to enable said rollers to be adjusted in tightening the endless aprons or belts hereinafter designated more specifically.

Journaled transversely of said frame 1, adjacent to the said light-compartment 5, in a plane one above the other, are two additional rollers 15 and 16, upon which the endless aprons or belts hereinafter designated specifically are also mounted.

The shafts of all the said rollers 11 and 12 and 15 and 16 extend a considerable distance beyond one end thereof, as shown in Fig. 1, and the shafts of the last-mentioned rollers are the drive-shafts, the shafts 17 and 18 of said first-mentioned rollers being merely (in the present arrangement) idlers.

The shaft 19 of the upper roller 15 is provided upon its extension end with a gear-wheel 21 and a common friction-clutch 22, which latter is controlled by a handle 23ᵃ. Fig. 4.

The said gear-wheel 21 is normally loose upon said drive-shaft 19, as is also one of the clutch-disks, so as to rotate at all times on said shaft, in a direction indicated by the arrow in Fig. 2.

Mounted upon the said lower rollers 12 and 16 is an endless belt or apron 23, which I shall hereinafter term the feed-belt, and mounted upon the said upper rollers 11 and 15 is another endless belt or apron, which is hereinafter called the overhead grouping-belt 24.

It is preferable that the endless-belts used in my machine be constructed of paraffined or oiled canvas, so that the eggs may be stopped, while the belts continue in motion, without undue friction between the eggs and the belts, during the testing of the eggs, in the manner hereinafter more fully described.

This detail however is not of great importance, as it will be understood that I may use any suitable belts, made of any desired material.

It should be noted that the upper stretch of the said feed-belt 23 passes above a stationary yielding supporting mat 25, Figs. 2 and 4, which is preferably composed of a base-board that is suitably secured to the vertical walls of the frame 1, between the upper and lower stretches of said belt, and has set in grooves in its upper surface a series of say five parallel soft-rubber longitudinal supporting-ribs 26, upon the upper free edges of which said upper stretch of said belt is supported as it travels towards the said light-chamber 5; and such construction prevents said belt from sagging, and at the same time provides a soft cushion for the eggs resting on the belt, and the eggs will be held up in proper position to be engaged by the rakes of the said overhead grouping-belt 24, as will be presently described more in detail.

Said feed-belt 23 is preferably provided upon its outer face with a series of parallel longitudinal soft-rubber ribs 27, which may be glued or cemented in place, or may be secured by rivets or other suitable fastenings, Fig. 4, and these ribs are spaced apart in such manner that one of them will pass directly above a corresponding one of the series of yielding supporting-ribs 26 of said belt-supporting mat 25; whereby the said ribs 27 will form longitudinal partitions or troughs upon the upper stretch of said feed-belt, and separate the eggs on the latter into longitudinal separate rows, which rest between adjacent ribs, and are thereby held and guided in rows towards said light-chamber 5, as the feed-belt carries them along.

The said upper belt, or rather the grouping-belt, 24, is provided with a series of transverse rakes 28, which are spaced apart a distance which will permit a group of say three dozen eggs to lay between any pair of them upon the said feed-belt 23, so that such group may be fed as a group to the transparent top of the said light-chamber 5; which action may be accomplished by starting up the said grouping-belt by means of its clutch-handle 23ª; it being understood that said group-belt normally stands still, until so started, the eggs between adjacent rakes rolling over and over without progressing towards the light-chamber, although the feed-belt is moving beneath them.

To prevent possible breakage of the eggs by contact of the hard rakes therewith, I have fitted soft-rubber strips or cushions 29 on the said rakes 28; which cushions may be secured to the free edges of the rakes in any desired manner, as by gluing, nailing or tacking; or, if desired, the entire rake-body may be made of rubber or other cushioning material. Fig. 2.

The top of the said light-chamber 5 may be of any desired transparent construction, but preferably I provide a series of glass-bars 30, which extend longitudinally of the machine across the top of said light-chamber, and are supported thereat upon end cross-bars 31 and longitudinal supporting-bars 32; said cross-bars having vertical recesses 33 in their upper edges, in which the said longitudinal bars are seated. Fig. 5.

Each of said glass bars 30 is fixed in place by means of cement or other suitable fastening-means, directly above and in contact with one of said longitudinal supporting-bars 32, so that said glass bars will be supported and reinforced throughout their lengths.

And reinforcing-rods 34 of suitable metal are preferably molded or cast in said glass bars 30, to make a still stronger construction. Fig. 5.

The upper surfaces of the said glass bars 30 are arranged to form longitudinal troughs 35, which register with the adjacent ends of the previously-described troughs between said ribs or partitions 27 on the feed-belt 23; whereby a practically continuous trough for the rows of eggs will be provided upon said belt and above the said light-chamber 5, and the eggs will be located in longitudinal rows while being tested above the latter.

This arrangement of the said glass bars also separates the rows of eggs while same are being tested above said light-chamber 5, and greatly facilitates the testing operation.

An inclined bridge 36 extends across the space between the said light-chamber 5 and the upper stretch of a delivery-belt 37, so that the tested eggs may pass directly from said glass-bars 30 onto said bridge and thence to said belt; said bridge being hinged to the upper part of said light-chamber at 38, so that it will be slightly inclined downwardly from said chamber to said belt, upon the upper surface of which latter the delivery-edge of said bridge lightly rests.

Said delivery-belt 37 is almost twice the width of the previously-described feed-belt 23, Fig. 1, and it is mounted upon a long transverse drive-roller 39 whose spindle or shaft 40 is journaled across the delivery-end of said frame 1, near the top thereof, and fixed on one end of said drive-shaft 40 is a sprocket 41, Fig. 1. An idle roller 42 is journaled transversely of said frame 1, and is engaged by the said delivery-belt at a point directly under the said bridge 36, the spindle or shaft of said idle roller being designated by the numeral 43.

The working space above the said wide delivery-belt 37 is divided by a vertical partition 44, which extends in a generally longitudinal direction from the said light-chamber 5 to the right-hand (or delivery) end of said frame 1, a slight distance above said belt; whereby the space above or on said belt in longitudinal alignment will be confined to tested normal-sized eggs, and the belt-surface on the opposite side of said dividing-partition 44 will carry the separated small-sized eggs from the small-egg table or shelf. The good small-sized eggs are preferably separated by hand from the large eggs, at the time they are over the said light-chamber 5, and said separated small eggs are placed upon a small-egg table or bench 45, which preferably has a slight inclination downwardly towards the receiving-end of said small-egg section of the said delivery-belt 37, Fig. 1, so that the small eggs placed on said table may roll directly onto said section of the belt.

A longer table or bench 46 is located alongside of the feed-belt 23, to be used as a stand for crates of eggs that are to be separated and tested.

For bracing the partition 44 I provide cross-bars 44ª, which have their ends bent at right-angles and bolted or riveted to the said partition and to the vertical wall of the frame 1, at points opposite those at which said bent ends are secured to the partition; whereby said bracing-means will extend across and above the said small-egg section of said delivery-belt 37, at a sufficient height to readily permit the eggs to roll under cross-bars.

The machine is preferably power-driven, by means of a suitable electric or other form of motor 47, which may be located in any desired position with reference to the machine, although I have here shown the motor mounted upon a suitable stand or platform 48 that is carried by the vertical wall of the machine frame, Figs. 2 and 4.

A worm 49 on the motor-shaft meshes with a spiral-gear 50 fixed on the adjacent end of a main drive-shaft 51 that is journaled horizontally across the frame 1 at a point directly above said worm, and carries two sprocket-wheels 52 and 53 in addition to the said spiral-gear.

A sprocket-chain 54 connects the said sprocket 53 to the previously-described sprocket 41 of the drive-roll of the delivery-belt 37, to drive the upper stretch of the latter towards the right-hand of Figs. 1 and 2, the driving-strain on said stretch of said belt tending to pull it taut at all times during operation of the machine.

Another chain 55 engages the other sprocket 52 that is on said drive-shaft 51, and passes around a sprocket 56 (shown only in Fig. 1) on the adjacent end of the shaft 57 of the drive-roll 16 of the feed-belt 23, to pull taut the upper stretch of the latter and thereby drive said feed-belt in the same direction as that of the said delivery-belt 37.

A reverse-drive for the said upper belt (the grouping-belt 24) is provided by a gear-wheel 58 that is fixed on the said shaft 57 of said drive-roll 16, and the previously-mentioned gear-wheel 21 on the clutch-controlled shaft 19, which carries the drive-roller 15 of said grouping-belt, Fig. 4, the said two gear-wheels being in mesh at all times.

In localities where power is not available, the machine may be readily operated by hand, by placing a hand-crank 51ª on the projecting-end of the said main drive-shaft 51, as shown in dotted lines in Fig. 1; or if desired, the motor 47 and its connections need not be used or provided at all, in constructing and operating small machines of lower price, for use of grocery-men and other small stores and establishments, where but a few dozen eggs are tested at one time.

At the feed-end, (the left-hand end) of the machine in Figs. 1 and 2, I have provided a feed-shelf 59, which is supported by suitable brackets or braces 60, at a height flush with the upper stretch of the said feed-belt 23, and provided thereat with devices for facilitating the feeding of crate-cells of three-dozen eggs at one time to the said feed-belt, whereon they will be engaged in groups by the said grouping-belt 24, and be maintained in groups until the grouped eggs have been tested and discharged onto the said delivery-belt 37.

The free end of said feed-shelf 59 is preferably rectangular in plan-view, Fig. 1, and has vertical walls on three sides to form an egg-crate cell-receptacle 61 that is of such dimensions that an ordinary paste-board egg-crate cell will fit loosely within said walls, and be supported therein temporarily, together with the three-dozen eggs it contains, above series of vertically-movable cell-discharging partitions 63, which are mounted in longitudinal slots 64 formed in the horizontal floor or bottom 65 of said cell-receptacle, Fig. 2.

Said partitions 63 are spaced apart by said slots 64, to form longitudinal troughs for the eggs to run or roll in, while they are being fed to the spreading-troughs 66 of the said feed-shelf 59, and while the said partitions are elevated with their upper edges about a half-inch above the plane of said slotted part 62 of the floor 65, after the egg-cell has been removed from the eggs, which will then rest upon said slotted parts of said floor, in longitudinal rows, ready to be moved towards the said feed-belt 23.

Said partitions rest upon and are movable up and down with two cross-bars 67, Fig. 2, the upper edges of which are fixed in vertical seats or slots 68 formed in the adjacent lower edges of said partitions, as shown more clearly in Fig. 7.

The ends of these cross-bars 67 are mounted to slide loosely in vertical seats or grooves 69 formed in the vertical opposite side-walls of said cell-receptacle 61, and the following described means are preferably used in raising and lowering the cross-bars and the parts carried thereby:—

Cams 70 are fixed upon non-circular portions of cam-rods 71, which are journaled in suitable bearings and extend across the cell-receptacle 61 in a plane below the lower edges of said cross-bars 67, Fig. 7, so that when said cams are moved in one direction by the handles 71ª on the outer ends of said cam-rods, said cams will engage the lower edges of said cross-bars and elevate them, together with the partitions 63 and the egg-cell a slight distance (say one-half inch) above the said floor 65 of the receptacle, for a purpose hereinafter mentioned; and so that when said cams are moved in a reverse direction, said partitions will be restored to their normal position, which is that shown in Fig. 7.

In Fig. 2 the parts just mentioned are shown in an elevated position, with the egg-troughs formed by said elevated partitions 63 in longitudinal-alignment with corresponding convex radiating or spreading trough-bars 66 that are located on the floor 65, and whose inner ends terminate at the feed-end of said feed-belt 23; whereby the rows of eggs in said troughs between said partitions may be fed in rows to the corresponding spreading troughs, 72 and from thence onto the said feed-belt.

It is to be noted that the above-described troughs extend in substantially-continuous longitudinal lines from the feed-end of the machine to the delivery-belt 37, Fig. 1, the said vertically-adjustable partitions 63 forming troughs between them on said cell-receptacle 61, which register with the adjacent feed-ends of the spreading-troughs 72, from which latter the eggs are discharged into the adjacent registering ends of the longitudinal troughs on the feed-belt 23 between the flexible-ribs 27 thereof, whence they pass into the adjacent ends of the light-chamber troughs 35, Fig. 1, and are finally delivered to the adjacent end of the said delivery-belt 37.

A telescopic or extensible-rake 73, Figs. 1 and 3, is preferably used in moving the eggs in rows from the said cell-receptacle 61 along the spreading-troughs 72, and delivering said rows spread farther apart to the wider troughs of the adjacent feed-belt 23, although of course the rows of eggs may be so moved by direct contact of the operator's hands, if desired; but by the use of said extensible-rake the movement of the rows of eggs will be greatly facilitated, and much time will be saved.

Said extensible-rake 73 is preferably composed of two sections, Fig. 3, made of soft wood or other material which will not break the eggs, and said sections arranged to slide upon or along-side of each other, and each section having a vertical handle 74 on its upper edge.

One of said sections is preferably provided with a longitudinal-groove 75 in which slides a mating longitudinal tongue 76 carried by the other section; whereby the sections will be guided in their extension and retracting movements.

Said sections of the extensible-rake 73 may be held loosely together in any desired way, or by any common means, such as a transverse strap or clasp 77, so that said sections will be slidable relative to or upon each other, and be moved longitudinally, in shortening or lengthening said rake, as required in moving the comparatively closely-adjacent rows of eggs from said cell-receptacle 61 to and along the spreading-troughs 72.

Obviously, if no such provision were made for lengthening said rake 73, it would be limited in length to the width of said cell-receptacle 61, and would be too short to engage all of the rows of eggs at the delivery-ends of said spreading-troughs 72 simultaneously, which is necessary for quick and efficient work.

In using the said extensible-rake 73, the operator grasps its handles 74, and shortens the length of the rake by sliding its sections upon each other, until the length corresponds to the distance between the opposite vertical walls of said cell-receptacle 61; then places said rake between the feed-end of the rows of eggs in said receptacle and the adjacent vertical end-wall of the latter; and then moves all of said rows toward and upon the said spreading-troughs 72, by forcing said rake behind them as they move along, and simultaneously lengthening the rake to correspond to the increased distance between said vertical side-walls of the said feed-shelf 59, until said rows of eggs are passed from said spreading-troughs onto the adjacent feed-belt 23.

It is advisable, and in fact almost necessary, that in testing the eggs they be viewed from both sides while above the light-chamber 5, and in order to effect this quickly and efficiently, I preferably make use of the sliding turning-rakes 78, illustrated in Figs. 1 and 2.

These turning-rakes 78 are two in number, although one only may be used if so desired. When two are provided, they are composed of a transverse bar made of rubber or of some other yielding material, or of wood covered with common cushioning-material such as sheet-rubber, so as to protect the eggs from breakage when the rakes are brought into contact with them during the turning operation; and one of said rakes is normally located over the receiving-ends of the series of glass-bars 30 above the said light-chamber 5, and the other one of said rakes 78 is normally separated such a distance from the first-mentioned rake that the space between the two rakes will be just about sufficient to accommodate three dozen eggs, in rows of six each, on said bars, so that when said rakes are simultaneously moved across and above said light-chamber said rows of eggs will be rolled back and forth and turned end for end on said bars, thus permitting the operator to look through the eggs from opposite sides or ends thereof.

Said turning-rakes 78 are each provided with a handle 79, that projects upwardly at a point about central of the length of the rake, convenient to the hands of the operator, who grasps one handle in one of his hands, and the other one is manipulated by the other hand, in rolling the rows of eggs forwardly and back over said light-chamber.

To maintain the said turning-rakes 78 in a transverse position at all times, and to guide them in their longitudinal movements, as well as to prevent them from being mislaid, I provide each of said rakes at like ends with a horizontal guide-bar or rod 80, which has its feed-end fixed to or made integral with the end of the rake which is nearest to the operator's side of the machine, and said bar is then extended at a right-angle to its rake, towards the delivery-end of the frame 1, and parallel with and alongside of the vertical wall of the latter a distance approximating two feet or more, so that the bar will always be freely slidable within a guide-loop 81 that is pivoted at 82 to the said vertical side-wall of said frame 1, near the top thereof at a point above the plane of the delivery-belt 37, Fig. 2.

By reason of the pivotal-mounting of said guide-loop 81, as just described, said guide-bars 80 of the turning-rakes 78 will not only be guided as they move loosely through said loop, and thus maintain said rakes in a position at right-angles to said bars, but the rakes may be simultaneously raised and lowered in lifting them over and passing them above the rows of eggs, as indicated by the dotted lines in Fig. 2. Preferably both of the said guide-bars operate in the same loop 81, the latter being of ample size to permit a reasonable independent movement of each bar, in operating said turning-rakes in the manner above described.

A delivery-gate 83 extends across the delivery-ends of the tested-egg section and the small-egg section of the delivery belt 37, so as to be swung up and down, in controlling the delivery of eggs to the recrating portable device, which will be presently described in detail.

Each end of said delivery-gate 83 is provided with a suitable hinge-arm or bracket 84, by means of which said gates are pivotally-connected to the adjacent vertical wall of the frame 1 at their outer ends and to the vertical partition 44 above the delivery-belt 37; there being a pin or pivot 85 passed through a perforation in each hinge-arm and engaging said frame and partition, Fig. 2, so that by grasping the gate-handles 86 said gates may be swung up or down, or raised and lowered, as desired, to block the passage of eggs from said delivery-belt, or to permit the eggs to pass therefrom into the portable recrating-device or into any desired receptacle.

To facilitate the recrating of the tested eggs (small-size eggs as well as normal-sized eggs) as they are delivered by the delivery-belt 37, I preferably make use of a portable recrating-device, which is temporarily placed upon a horizontal delivery-shelf 87 that extends transversely of the said frame 1 at the delivery-end thereof, at about the same height as that of the upper stretch of said delivery-belt, so that eggs from the latter may be discharged directly into the portable recrating-device. Fig. 2.

Braces 88 assist in supporting said delivery-shelf, which latter may be termed also the recrater-support.

Said portable recrating-device is composed, in the present illustration, of a light rectangular egg-receptacle, made of wood, sheet-metal or any other desired material, of such dimensions as will accommodate three-dozen eggs at a time; a dumping-bottom made up of dump-slats 89 that are fixed at one edge and carried by a light rock-shaft 90, and separated into individual egg-supporting dump-sections 91 by transverse-slots 92 (Fig. 8); means for locking said dump-sections when in normal closed position; means for simultaneously dumping said dump-sections, to dump the entire charge of three-dozen eggs into a common egg-cell of an egg-crate; means for returning the dumped dump-sections simultaneously to their normal closed positions, ready to support an additional charge of eggs, as will be presently described in detail; opposite vertical side-walls 93; an end-wall 94; a movable vertical feed-wall 95, that is preferably provided with hinge-arms 96 at its ends that are pivoted at 97 to the opposite vertical side-walls 93, to normally close the feed-side of said egg-receptacle, and prevent the eggs from accidentally falling out of said feed-side while the device is being lifted by hand from its position on said delivery-shelf 87, to carry the eggs to the egg-crate; and a suitable handle 98, which may be grasped by the operator as he would a common market-basket handle, in lifting the device back and forth between the delivery-shelf and the egg-crate. Figs. 2 and 6.

Said handle 98 has been omitted in Fig. 1, so as not to confuse the showing of the other more important parts of the dumping egg-receptacle and carrier.

Said hinged feed-wall 95 may be provided with a handle 99, for convenience in lifting it to an open position, when the eggs are being run into the dumping egg-receptacle and carrier from the delivery-belt 37.

A series of six of the said rock-shafts 90 extend transversely across the said dumping egg-receptacle and carrier, and are journaled in the said opposite vertical side-walls 93 thereof; said shafts being parallel and spaced apart such a distance as will permit a normal-sized egg to pass between them when rocked in dumping the eggs carried by said dump-sections 91.

Necessarily, said rock-shafts 90 are journaled quite near the lower edge of said vertical side-walls 93, in order that the dump-sections 91 may, when in a closed position, lie flush with said lower edge of said side-walls, and rest upon the top of said delivery-shelf 87, when the handled egg-receptacle is being loaded with eggs. Fig. 2.

In Fig. 1 I have shown two of the said egg-receptacles in position upon the delivery-shelf 87, one of said receptacles being located on said shelf to receive three-dozen tested normal-size eggs from said delivery-belt 37, and the other receptacle being located alongside the other, and adapted to receive three-dozen lots of tested small-size eggs from the small-egg section of said belt.

The detail-construction of the said egg-receptacle is shown more clearly in Fig. 6, where it is illustrated removed from said delivery-shelf and temporarily in position within the open top of a common egg-crate casing 100, ready to dump three-dozen tested eggs into the well-known paper egg-cells 91ª thereof.

As is well known, these egg-cells 91ª each have a loose horizontal bottom-sheet 101 of pasteboard, upon which all of the three-dozen eggs of the cell-rest, Fig. 6, and are thus protected from breakage by contact with eggs in the cell beneath.

Said horizontal bottom-sheet 101 also acts as a protective cover for the eggs contained in the cell 91ª immediately beneath said bottom-sheet.

Preferably, the ends of the said rock-shafts 90 are journaled in the lower ends of V-shaped hangers 102 that are fixed against the inner face of the said vertical side-walls 93 of the portable egg-receptacle and carrier by means of nails or tacks 103 which are driven through perforations formed in the upper portions of the arms of said V-shaped hangers and thence into said vertical side-walls. Fig. 6.

The said dump-sections of all of the series of six dump-shafts 90, are all operated simultaneously, either to a dumping position or returned to a closed position, by means of a single operating or dumping-lever 104, which is shown in a vertical position in the present case at the right-hand of Figs. 2 and 6.

When said dumping-lever is in a vertical position, the dumping-sections 91 are all closed, to form a support for each egg that may be thereupon suspended in the portable egg-container; but when said lever is thrown to an inclined position, as indicated by the dotted lines in Fig. 6, all of the said dump-sections will be dumped, and will then hang in a vertical position, as also shown by dotted lines in Fig. 6, and dump the eggs carefully into the appropriate egg-compartments of the underlying egg-cell 91ª of the egg-crate 100.

At one end of each of said dump-shafts 90, a vertical dump-arm or crank 105 has its lower end fixed upon said shaft by any suitable means, such as by making a non-circular or squared portion 106 on said shaft, Fig. 8, and providing the lower ends of said cranks with a suitable non-circular bearing to be mounted on said squared-portion; or, if desired, a squared-portion 106 may be formed on both ends of said shafts, and cranks 105 may be mounted thereon, or fixed to the shafts in any other common manner, so that said shafts will be driven from both ends.

All of said cranks 105 are simultaneously moved by means of a horizontal connecting-rod or flat bar 107, which extends parallel with and alongside of the adjacent vertical side-wall 93 of the portable egg-carrier or egg-receiver, Fig. 6, and the upper ends of all of the series of cranks 105 at that side of the device, are pivoted at 108 to the said connecting-rod or bar.

An inclined connecting-bar or rod 109 has its lower end pivoted at 110 to the most-distant end of said horizontal connecting-bar 107, or to one of said dump-cranks, and the uppermost end of the said inclined connecting-bar is pivoted at 111 to the said dump-lever 104 preferably at or near the upper end of the latter, as shown in Fig. 6, so that upon manipulating this single dump-lever all of the dump-sections 91 will be actuated simultaneously.

For locking all of the dump-sections 91 in a horizontal or closed position, I have provided an inclined locking-brace 112 the lower end of which is pivoted at 114 to one of the dump-cranks 105, or to said horizontal connecting-bar 107, near the pivoted lower end of said inclined connecting-bar 109, and the upper or outer end of said locking-brace is provided with means for detachably connecting it with the said dump-lever 104 at a point below that at which said inclined connecting-bar is attached, and such means for detachably connecting said inclined locking-bar to said dump-lever is composed of a pin 115 projecting laterally from said dump-lever, and a suitable means such as a notch 116 in the lower edge of said inclined locking-brace, engages said pin and holds the parts in a locked position.

A suitable knob or handle 117 may be attached to the upper end of the said dump-levers 104, for convenience in operating the latter. Figs. 1 and 2.

To prevent any possible slippage of the feed-belt 23, I propose to rivet to the under side (or rather the inside) thereof common sprocket-chains 118, the links whereof are provided with the usual lateral perforated attaching-gears 119, for securing the edges of said belt to said chains. This chain-drive modification is shown in Fig. 4. Said chains run upon the usual sprocket-wheels 120 that are fixed on the ends of the rollers 16 and 12, that carry said feed-belt. Fig. 4.

And instead of mounting the said grouping-rakes 28 on a canvas belt 24, as previously described, I may do away with such belt, and use in its stead common sprocket-chains 118, and attach said rakes directly to said chains, by means of perforated attaching-ears 119 or other common attaching-devices.

In such modification, the said grouping-rake chains 118 will be mounted on sprockets 120 that are fixed on the ends of the rollers 15 and 16 that carry said chains, as shown in Fig. 4.

*The operation.*

The operation is substantially as follows:

Power is applied to the machine by starting up the motor 47 (or by turning the hand-crank 51ª where no motor-power is available or desired), whereupon the feed-belt 23 and the delivery-belt 37, will be moved as above described, as will also the grouping-rakes 28 carried by the upper belt 24, or by the sprocket-chains 118 (Fig. 4) if the latter are used instead of a canvas grouping-belt.

The eggs to be tested are to be removed from their egg-crates (if crated) in three-dozen lots, by lifting such lots from the crate while contained in the usual crate-cells (as shown in Fig. 6, by the numeral 91ª) and while the usual cell bottom-sheet 101 supports said lots in said cells; then said cells are placed (one at a time, as required) within said cell-receptacle 61, with said bottom-sheet resting upon said slotted-part 62 of the floor 65, and resting above the upper edges of the said cell-discharging partitions 63, which operate vertically in the slots 64 of the slotted-part of said cell-receptacle, at the feed-end of the machine, Figs. 1 and 2; then the said cell bottom-sheet 101 is withdrawn from beneath the eggs in the cell that is thus seated in said cell-receptacle 61, thereby allowing said seated eggs to rest upon said slotted-part 62 of the floor of said receptacle, in the form of longitudinal-rows of six; then the said partitions 63 are raised about one-half inch, by grasping the partition-operating handles 71ª and turning said partition-operating cams 70 from the position in which they are shown by the dotted lines in Fig. 7 to that in which they are shown in full-lines in the last-mentioned figure, and in Fig. 2, thereby confining said rows of eggs in longitudinal-troughs that are formed by said partitions, as before described; and the rows of eggs will then roll (or be rolled by hand) to and upon the adjacent ends of the said spreading-troughs 72. from which they will pass into the longitudinal-troughs formed on the said feed-belt 23, and be thereby carried in longitudinal-rows towards the light-chamber 5.

While the rows of eggs are upon the feed-belt 23, they are kept separated in rows or groups of six in each group, or are separated into group-rows of six eggs in each group-row and six group-rows, making three-dozen eggs in each group, by the grouping-rakes 28 carried by the overhead grouping-belt or chains, as previously described, which rakes pass between each group of three dozen eggs, and keep them in three-dozen groups, as said groups pass towards the said light-chamber 5; said grouping-rakes being carried along at the same speed as that of said feed-belt, when the grouping-rake clutch 22 is thrown in by means of its operating handle 23ª. Of course, the operator may stop and start said grouping-rakes 28 whenever required, to make and feed the groups of eggs; it being understood that when said rakes are stopped and the feed-belt 23 continues its movement the eggs between adjacent grouping-rakes on said feed-belt, will also stop, and will roll over and over on said belt, or the belt will simply slide beneath said eggs, without feeding them towards the said light-chamber 5, as the convenience of the operator dictates.

By the action of said grouping-rakes 28. as described, the groups of eggs are forced upon the said glass-bars 30, and into the longitudinal-troughs 35 between said bars, in groups of three-dozen eggs, above said light-chamber, where they are held for inspection, by stopping said grouping-rakes a short time, by means of said clutch-handle 23ª.

While the eggs are in position over said light-chamber 5 the operator will glance through the eggs and readily ascertain whether they are in a suitable condition or not, and will there separate the eggs that are not suitable, and will place the small-sized eggs upon the small-egg table 45, whence they will roll (or be moved) onto the small-egg section of the delivery-belt 37, to be disposed of in any desired manner, or as hereinafter mentioned.

However, before any separation of the eggs takes place while they are over the said light-chamber 5, the operator grasps the turning-rakes 78 by their handles 79, and keeps the groups of eggs in three-dozen lots while over said light-chamber, by locating a lot of three-dozen eggs between the two turning-rakes, and then simultaneously moving said rakes forward and back a slight distance; whereby the rows of eggs will be rolled back and forth and turned end-for-end on said glass-bars 30, and the inspector may look through said eggs from opposite sides or ends, and make a very thorough inspection thereof.

Then the turning-rakes 78 are elevated to a point above the plane of the rows of inspected eggs, as indicated by the dotted lines in Fig. 2, and the inspected eggs are discharged from said glass-bars 30 onto the inclined bridge 36, and thence onto the delivery-belt 37, which latter carries them to the delivery-end of the machine, there to be recrated, or otherwise disposed of as desired.

*The operation of the portable recrating and egg-handling device.*

To facilitate the recrating, or handling, of the tested eggs, they are run into portable recrating-devices, which are temporarily supported upon a horizontal delivery-shelf 87, the use and operation of which portable device has already been fully described, and will not be repeated here.

From the foregoing description, and a study of the drawings, it will be apparent that I have thus provided a simply constructed and easily operated apparatus by means of which large quantities of eggs may be handled and tested in a remarkably short time and with very little effort on the part of the operator and his assistants; although, as previously stated, smaller machines may be constructed and used to advantage in grocery-stores, bakeries, and other places where only a few dozen eggs are to be tested each day.

The larger machines are particularly advantageous for use in cold-storage plants, commission houses, large henneries or other places where eggs in great quantities are handled.

The apparatus is a great time-saver, as well as a labor saver, and consequently will be economical in every way.

While I have shown and described one form of the invention it is of course to be understood that I reserve the right to make such changes and improvements in the form, construction and arrangement of the various parts as will not be a departure from the spirit of my invention or the scope of the appended claims.

I claim:—

1. A machine for testing eggs, comprising a suitable supporting-frame; an endless feed-belt arranged to carry the eggs to be tested to the location at which they are to be tested; a light-chamber over which the eggs are passed in testing; a delivery-belt arranged to receive the tested eggs after same have been passed above said light-chamber; endless supporting-means carrying grouping-rakes which are spaced apart and constructed to move a group of eggs between them towards said light-chamber, and to force said group of eggs onto glass supporting-members above said light-chamber, after said group of eggs has passed over said feed-belt; a suitable motor or power-producing means arranged to simultaneously drive the upper stretches of said feed-belt and said delivery-belt in the same direction, and to drive said grouping-rakes in the same direction above said feed-belt, while a group of eggs is located between adjacent ones of said grouping-rakes; a source of light in said light-chamber; and a clutch by means of which the movements of said grouping-rakes may be started and stopped at will, without stopping said delivery-belt or said feed-belt.

2. In an egg-testing machine of the character described, the combination with the parts enumerated in the above claim 1, of a yielding stationary supporting-mat arranged horizontally beneath the upper stretch of said feed-belt, to support the same and prevent sagging, and at the same time act as a cushion for the eggs resting upon said belt.

3. In an egg-testing machine, the combination with the parts enumerated in the above claim 1, of a yielding stationary supporting-mat arranged horizontally beneath the upper stretch of said delivery-belt, for the purpose described.

4. In an egg-testing machine, the combination with the parts enumerated in the above claim 1, of a series of longitudinal yielding-ribs made of soft-rubber or other yielding material and fixed in spaced relation upon the outer surface of said feed-belt, to form longitudinal troughs in which rows of eggs to be tested are carried to said light-chamber.

5. In an egg-testing machine, the combination with the parts enumerated in the above claim 1, of a feed-shelf at the feed-end of the machine frame, the feed-end of said shelf having a series of spaced-apart longitudinal slots in its bottom or floor; a series of vertically-movable egg-cell discharging partitions mounted in said slots and arranged to form a series of longitudinal-troughs; and means for simultaneously elevating the upper edges of said partitions to a plane above that of said floor and for releasing them and allowing said partitions to resume their normal positions.

6. In an egg-testing machine, the combination with the parts enumerated in the above claim 1, of spreading-troughs arranged intermediate of said egg-cell discharging means and said feed-belt; whereby the eggs will be separated in rows by said partitions, and delivered into the said spreading-troughs in rows separated a greater distance, which corresponds to the distance between the said longitudinal yielding-ribs that form troughs on the said delivery-belt.

7. In an egg-testing machine, the combination with the parts enumerated in the above claim 1, of a telescopic handled rake, for moving a series of rows of eggs simultaneously in the spreading-troughs.

8. In a machine for testing eggs, the combination with the light-chamber and other parts enumerated in the above claim 1, of longitudinally-arranged glass-bars constructed to form longitudinal troughs above said light-chamber, the feed-ends of which register with adjacent delivery-ends of longitudinal-troughs on said feed-belt.

9. In a machine for testing eggs, the combination with the light-chamber and other parts enumerated in the above claim 1, of two turning-rakes mounted on guide-bars and extending transversely of the frame across said light-chamber and adapted to control the turning of a group of eggs that is situated between said rakes and that is supported above said light-chamber; and means whereby the guide-bars of said rakes are pivotally and slidably connected to the adjacent vertical side-wall of the machine frame.

10. In an egg-testing machine, the combination of the parts enumerated in the above claim 1; a delivery-shelf at the delivery-end of said frame; and a portable re-crating-device having dumping bottom-sections upon which the eggs to be crated are delivered directly from said delivery-belt.

In testimony whereof, I have signed my name to this specification in presence of two subscribing witnesses.

THOMAS GRUBB.

Witnesses:
JOHN C. HIGDON,
HENRY L. HIGDON.